Patented Jan. 22, 1935

1,988,821

UNITED STATES PATENT OFFICE 1,988,821

CEMENT

Donovan Ragnar Efraim Werner, Stockholm, Stig Giertz-Hedström, Djursholm, and Otto Stålhane, Stockholm, Sweden No Drawing. Application September 26, 1932, Serial No. 634,926. In Sweden September 26, 1931

4 Claims. (Cl. 106—24)

The present invention relates to a cement substantially consisting of dicalcium silicate ($2CaO.SiO_2$) and arsenious acid ($As_2O_3$). This cement may be obtained directly by mixing the two ingredients which should be in a finely grained state, or they may be pulverized during the mixing operation. No further treatment is necessary, but the cement may be used in said condition in the same manner as most of the kinds of cement known, such as Portland cement.

Dicalcium silicate may suitably be produced by burning or fusing in suitable proportions, and at a suitable temperature, a finely pulverized or grained mixture of lime stone or silica or quartz, or the like material, for instance materials rich in lime or materials rich in silicon dioxide which burning may be carried out in the usual way for producing cement, and the apparatus commonly used thereby. Depending on the burning temperature and time of burning, the rapidity of the cooling and the kind and purity of the raw materials the dicalcium silicate may, as known, be obtained in different modifications, which usually are designated $\alpha$, $\beta$ and $\gamma$. The $\alpha$ modification and the $\beta$ modification will hereby sinter and it will be necessary to pulverize it so as to be able to use it according to the invention. The $\gamma$ modification will, according to this method, be obtained in pulverized form directly. The dicalcium silicate in any of said forms cannot be considered as a cement in its usual sense. However, the $\alpha$ form and $\beta$ form can be converted in pulverized form together with water to hardening masses, although said conversions take place too slowly for commercial purpose. The $\gamma$ form reacts still slower with water and, practically, does not get hard. Portland cement usually contains smaller amounts of $\beta$ dicalcium silicate, which is considered to assist in the slow "after-hardening" thereof.

The arsenious acid (arsenious trioxide) ($As_2O_3$) used may for instance be such obtained as by-product in roasting arsenious ores, which may be recovered in known ways from flue gases, when it is obtained in pulverulent form.

In use the cement according to the invention has a high strength and is especially characterized by a low solubility in water. The time necessary for the binding of said cement depends on the modification of the dicalcium silicate. If the $\alpha$ and/or $\beta$ modification is in majority the cement will bind together comparatively rapidly, while the cement, if its content of the $\gamma$ modification of the dicalcium silicate is predominant, will bind comparatively slowly. By the use of suitable amounts of the different modifications any desired time of binding between said limits may be obtained. In a certain degree the form of the dicalcium silicate used has also influence on the necessary amount of water to be used and on the increase in strength.

For certain purposes it may be suitable to use a mixture of the above stated new cement and other cement, such as Portland cement. Said mixture of cement binds still more rapidly than the above stated new cement.

Articles produced from cement according to the invention have the properties characteristic of cements, viz. high strength and difficulty of dissolving in water. Such articles may be produced by casting or forming in a similar way as that used when producing articles from common cement. One may also produce articles containing a mixture of dicalcium silicate and arsenious acid ($As_2O_3$) for instance in such way that in the producing, forming or casting of said articles said ingredients be mixed together with water and other substances that may be necessary, such as sand and the like.

In order to make clear the invention the following examples are given.

1. Cement consisting of or containing 60–95 parts by weight finely ground material containing at least 75 per cent $\alpha$ and/or $\beta$ dicalcium silicate and 40–5 parts by weight of a material containing at least 75 per cent arsenious acid ($As_2O_3$);

2. Cement consisting of or containing 50–90 parts by weight of a material containing at least 75 per cent $\gamma$ dicalcium silicate and 50–10 parts by weight of a material containing at least 75 per cent arsenious acid ($As_2O_3$);

3. Cement consisting of or containing 1–2 parts by weight of a cement according to Example 1, and 2–1 parts by weight according to Example 2 above given.

Having thus described our invention we declare that what we claim is:—

1. Cement, substantially consisting of discrete, C. P. dicalcium silicate ($2CaO.SiO_2$) and arsenious acid (arsenious trioxide ($As_2O_3$).

2. A cement consisting essentially of dicalcium silicate of the $\gamma$ modification, and arsenious acid.

3. A cement consisting substantially of discrete, C. P. dicalcium silicate, arsenious acid, and Portland cement.

4. A cement consisting substantially of 60 to 95 parts by weight of a finely ground material containing at least 75% by weight dicalcium silicate and 40 to 5 parts by weight of a material containing at least 75% arsenious acid.

DONOVAN RAGNAR EFRAIM WERNER.
STIG GIERTZ-HEDSTRÖM.
OTTO STÅLHANE.